United States Patent
McQuaid

(10) Patent No.: US 9,763,169 B2
(45) Date of Patent: Sep. 12, 2017

(54) GEOGRAPHICAL DETECTION OF MOBILE TERMINALS

(71) Applicant: VODAFONE IP LICENSING LIMITED, Newbury, Berkshire (GB)

(72) Inventor: Gerald McQuaid, London (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 0 days.

(21) Appl. No.: 14/961,358

(22) Filed: Dec. 7, 2015

(65) Prior Publication Data

US 2016/0165517 A1 Jun. 9, 2016

(30) Foreign Application Priority Data

Dec. 8, 2014 (GB) .................................. 1421815.0

(51) Int. Cl.
| | |
|---|---|
| H04W 4/00 | (2009.01) |
| H04W 48/04 | (2009.01) |
| H04W 4/02 | (2009.01) |
| H04M 15/00 | (2006.01) |
| H04W 12/08 | (2009.01) |
| H04W 8/18 | (2009.01) |

(52) U.S. Cl.
CPC ........... *H04W 48/04* (2013.01); *H04M 15/58* (2013.01); *H04W 4/021* (2013.01); *H04W 12/08* (2013.01); *H04W 8/18* (2013.01)

(58) Field of Classification Search
CPC ..... H04W 48/04; H04W 12/08; H04W 4/021; H04W 8/18; H04M 15/58
See application file for complete search history.

(56) References Cited

U.S. PATENT DOCUMENTS

| | | |
|---|---|---|
| 2008/0043993 A1 | 2/2008 | Johnson |
| 2011/0081885 A1 | 4/2011 | Sennett et al. |
| 2011/0165861 A1* | 7/2011 | Wilson ..................... H04K 3/65 455/411 |
| 2011/0183646 A1 | 7/2011 | Kramarz-Vonkohout et al. |
| 2011/0319010 A1 | 12/2011 | Nelkenbaum |
| 2012/0009937 A1* | 1/2012 | Daly ...................... H04W 48/04 455/456.1 |
| 2014/0004817 A1* | 1/2014 | Horton .................... H04W 4/26 455/405 |

(Continued)

FOREIGN PATENT DOCUMENTS

| | | |
|---|---|---|
| EP | 2 677 814 A1 | 12/2013 |
| GB | 2 507 119 A | 4/2014 |
| WO | WO2011/043950 A1 | 4/2011 |

OTHER PUBLICATIONS

GB Search Report for GB1421815.0 dated May 28, 2015.
European Search Report for EP 15 19 6684 dated May 18, 2016.

*Primary Examiner* — Ajit Patel
(74) *Attorney, Agent, or Firm* — Workman Nydegger

(57) ABSTRACT

One or more telecommunication network cells, each having a geographically distinct radio coverage area, communicate with a mobile terminal so as to identify it and generate information about its usage thereby. Indications of usage of the mobile terminal within the predefined geographical location range and usage of the mobile terminal outside the predefined geographical location range can then be provided based on the information about usage of the mobile terminal generated by the one or more telecommunication network cells.

17 Claims, 2 Drawing Sheets

(56) References Cited

U.S. PATENT DOCUMENTS

2014/0159905 A1    6/2014  Thompson
2014/0194084 A1*   7/2014  Noonan ............... H04W 8/005
                                                455/404.1
2015/0312766 A1*  10/2015  Teeni .................... H04W 4/043
                                                455/411

* cited by examiner

GEOGRAPHICAL DETECTION OF MOBILE TERMINALS

CROSS REFERENCE TO RELATED APPLICATIONS

This application claims benefit and priority to Great Britain Application Number GB1421815.0, filed on December, the entireties of which are incorporated herein by reference.

TECHNICAL FIELD OF THE INVENTION

The invention concerns a system and method for indicating usage of a mobile terminal within and outside a predefined geographical location range.

BACKGROUND TO THE INVENTION

Owners or supervisors of controlled or secure locations often wish to prevent unauthorised mobile communication devices (such as mobile telephones or tablets) from having network access. Examples of such locations may include prisons, government buildings and banks, including vaults and other secure rooms. Access to the network may therefore be managed in a particular way to deny or control user access as required by the coverage area in question. It is often detrimental for the same network access restrictions to be imposed on all mobile terminals though. In the example of a prison, it may be desirable to prevent unauthorised mobile telephone use by prisoners within the prison, whilst still allowing prison officers to use mobile communication devices in the same location.

Accordingly, monitoring and imposition of access rights should be made on a per-device or per-mobile terminal basis, such that the appropriate parties gain access to appropriate network features. It should also be noted that mobile terminals entering the secure area are likely to be subscribers to several different mobile network operators. Hence, this management, monitoring and imposition of access rights should be made across multiple operators.

There are a range of existing options for managing or preventing network access in specific locations, but all of these have drawbacks. For example, Radio Frequency (RF) jamming technologies deliberately use radio signals to disrupt other radio communications. In a small, well-defined location such as a room or corridor, jamming can prevent reception of other signals. Nonetheless, this technology is crude, because the propagation of the jamming transmissions are difficult to control and it inherently assumes that anyone in the vicinity of the jamming equipment should not be able to send and/or receive desired transmissions. Thus, the jamming process is indiscriminate and will block everything from emergency services users to ordinary users unrelated to the secure location. In addition, there are territorial legal restrictions regarding the operation of jamming equipment in certain places.

Another approach uses network probes, which can monitor data being transmitted between two points in a half-duplex network. These may allow traffic between point A and B to pass through the probe, whilst it makes a copy on a so-called "monitor port". Access can be blocked or only allowed for one or more mobile terminals or User Equipment (UE) on a predetermined list. Such network probes must be inserted into the network and are therefore operator-specific. Moreover, the predetermined list or lists requires configuration and maintenance, which imposes an additional burden.

In the example of a prison, some users can be permitted access and others blocked, but this requires collating the authorised users and providing these to individual operators. This can cost a large amount of money and can be out-of-date quickly. Such an approach is called a 'snapshot test'.

It would be desirable to maintain constant oversight of any access to the controlled area over a longer period, such as 24 hours, and allow granular control. For example, a visitor may be allowed access to a specific service for a time-bounded period. There is currently no straightforward or automatic technique for configuring such a system, however.

SUMMARY OF THE INVENTION

Against this background, there is provided a system for indicating usage of a mobile terminal within and outside a predefined geographical location range and a method for indicating usage of a mobile terminal within and outside a predefined geographical location range. A corresponding computer program is also provided, although the invention may also be embodied in the form of programmable logic, firmware or other configurable system. A usage analysis system is further considered. Other preferred features are disclosed with reference to the claims and in the description below.

Whilst the invention is described with reference to a cellular network, it is also possible to consider other forms of wireless network, such as a wireless Local Area Network (LAN) or Wide Area Network (WAN). A number of wireless network cells are used to identify when one or more specific mobile terminal is within a predefined geographical location range (such as a specific part of a building, any part of a specific building or a confined geographical area) and when it is outside that area. For example, the coverage area of at least some or all of the cells may be same as or at least cover the predefined geographical location range. An indication of usage may include a lack of usage. In some embodiments, a lack of usage outside the predefined area may be inferred using information about usage within the predefined area. Direct detection of usage outside the predefined area may not be necessary.

The system may maintain monitoring coverage by way of small snapshots throughout the monitoring requirement (which could be permanent). In other words, the system could be configured to provide the indications of usage at intervals, which may be less than one minute, 2 minutes, 3 minutes, 4 minutes, 5 minutes, 10 minutes, 15 minutes, 20 minutes 25 minutes, 30 minutes, 45 minutes or 60 minutes in length.

The cells may be small cells, such as femto cells or pico cells. The cells are optionally separate from any cells or other access points providing access to the network communications service. In preferred embodiments, it is possible to detect relative movement of the mobile terminal between within the predefined geographical location range and outside the predefined geographical location range. For instance, this may be through one or more gateways (as might be the case in a prison, hospital, bank, secure room, other small area or small building).

Typically, the cells do not just passively receive information from the mobile terminal or terminals, they also transmit information (for example, to encourage or prompt the mobile terminal or terminals to identify themselves), which may considered an active technique. This can be achieved by the cells changing or cycling a Location Area Code (LAC) that is transmitted at intervals. This may prompt the mobile terminal or terminals to communicate with one or more of the cells, thereby identifying themselves and allowing information about their location to be determined.

In embodiments, the one or more mobile terminals are passively monitored. Additionally or alternatively, a parameter or level of authorisation in respect of the mobile terminal or another mobile terminal may be set, in particular dependent on the indications of usage of the mobile terminal within and outside the predefined geographical location range. This level of authorisation may relate to an ability of the respective mobile terminal to access a telecommunication network service, for example. This provides a form of feedback, so that the determined indications of usage can have an active effect on the mobile terminal or terminals.

Thus, an access permission for each of the one or more mobile terminals can thereby be set. This permission may be set dependent on the indications of usage of the mobile terminal within and outside the predefined geographical location range. Thus, the indications about the usage of the mobile terminal within and outside the predefined area may be sufficient to allow a determination about whether the mobile terminal is to permitted access to one or more network communications services (voice, video, messaging and/or data for example) and the scale of access that may be allowed. Another parameter or level of authorisation that can be set may relate to data rate, logging of usage or triggering of an alarm.

BRIEF DESCRIPTION OF THE DRAWINGS

The invention may be put into practice in a number of ways, and a preferred embodiment will now be described by way of example only and with reference to the accompanying drawings, in which.

DETAILED DESCRIPTION OF A PREFERRED EMBODIMENT

In order to determine whether a mobile terminal (for cellular systems, a User Equipment or UE and for wireless LAN systems, a client device, for instance) should be given access to one or more network services and the scale of access to be permitted, an automatic system can be used to identify where usage of the mobile terminal is taking place. For example, usage that takes place only within the secured or restricted location may indicate that access should not be provided, whereas usage immediately outside the restricted location and subsequent usage within the restricted location may indicate that the mobile terminal should be given improved access rights. Detecting that usage that takes place only within the secured or restricted location need not require monitoring of the mobile terminal outside that location.

Determination as to where the mobile terminal is being used may be carried by network cells. In particular, a group of dedicated cells may be provided for that purpose, especially small cells (that is, cells with a relatively small coverage area). Small cells are increasingly and more widely being deployed for use in areas of poor cellular coverage or in areas requiring greater capacity than available through the macro network. Small cells include femto cells, pico cells and other similar devices. The dedicated cells are termed "presence cells" and are separate (both physically and in the sense that they are separately managed or operated) from other cells that may be provided by one or more cellular networks to allow access to network services. The presence cells are used to detect where the mobile terminal is being used without allowing any access to network services and indeed, typically lack the capability to provide such access.

Detected usage patterns can be compared to identify that a mobile terminal has not left the area. This concept is an automated platform. The interaction between the presence cells and the mobile terminals can be centrally monitored. Based on the information retrieved from the presence femto cell network, access to the network can be granted or denied in this centralised way. The cells can be placed in any area where unauthorised use of mobiles should be detected and subsequently prevented. The use of presence femto cells is preferable but not essential, as will be discussed below.

Figure 1:
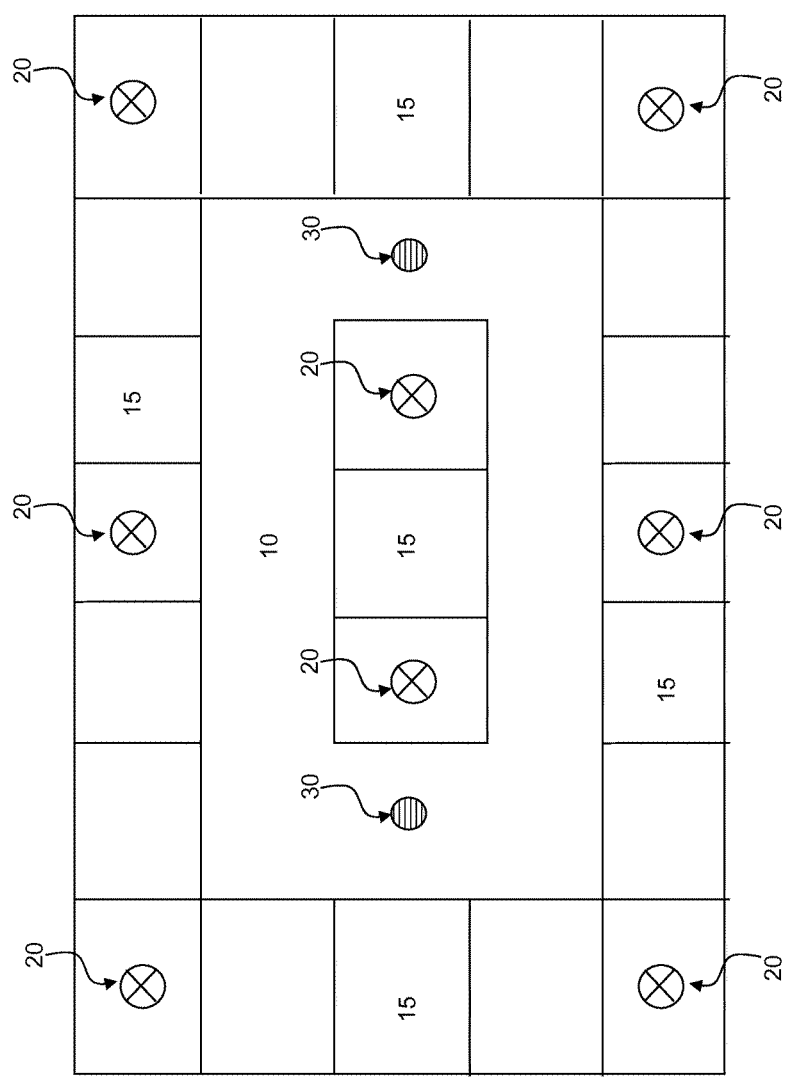
FIG. 1 illustrates a schematic layout of cell locations to detect coverage within an example secure location.

Referring first to FIG. 1, there is illustrated a schematic layout of cell locations to detect coverage within an example secure location. The example shown is intended to resemble a prison environment, with a corridor 10 and a plurality of rooms 15 (only a small sample of which are shown with this reference numeral).

A presence femto cell network comprising one or more femto cells 20 (or multiple types of small cell), are positioned at convenient locations within an area where cellular network access is to be monitored/controlled. For instance, the presence femto cells 20 may be placed in concentric rings or in a pattern to allow greatest intelligent collection with regard to location. As discussed above, the presence femto cell 20 does not provide cellular coverage and effectively acts as a type of investigation box, in that UE will believe that the presence femto cell is a normal femto cell and accordingly will transmit all of the requisite device specific data (for instance an International Mobile Subscriber Identity, IMSI) in an attempt to connect to the perceived cellular network. The network access may be provided by one or more separate regular cells 30, although in some embodiments the regular cells 30 may be access points for a wireless LAN or WAN network.

The operation of the presence femto cell in this way is similar to that of an existing device, known as an "IMSI catcher". This is effectively a type of simulated base station (although it appears as genuine to a UE) used for the identification of traffic and tracking of users of mobile devices and particularly discovering UE identities, such as their IMSI and/or their Mobile Subscriber Integrated Services Digital Network (MSISDN). Whilst a genuine base station would only communicate periodically with a UE, an IMSI catcher triggers the UE to transmit more frequently and send its IMSI. This is achieved by giving the IMSI catcher a different Location Area Code (LAC) from the normal surrounding cellular network, making the UE believe that it has moved areas and needs to register with (attach to) a new base station. This is typically achieved by cycling through LACs. However, IMSI catchers are only used at a single point in time, to determine a UE's identity and do not monitor more continuously or block communications. A development on an IMSI catcher can count the number of UEs within a specific area at a given time and this is discussed in EP-2 182 752 A1. The presence femto cell will typically cycle LAC codes to ensure that the terminals attempt to connect regularly and present their IMSI and their presence can therefore be tracked, especially by use of a network of multiple presence femto cells. It should be noted that this approach can similarly be applied to other types of wireless network, such as a Wireless LAN system. In that case, the mobile terminal (or client device) may be identified by means of a MAC address.

The IMSI and/or MAC address data is recorded and analysed to determine the relative movement of the device within the specific location area and outside the specific location area to determine that the device does not leave the area and illegitimate use can be inferred. The comparison is performed at an automated platform, as will be discussed below. A single mobile network operator may passively host the platform that analyses the usage but that mobile network operator's network need not be essential to the tracking and analysing. The system may therefore be advantageously made multi-operator.

In a generalised sense, this may be understood as a system for indicating usage of a mobile terminal within and outside a predefined geographical location range. The system comprises: one or more telecommunication network cells, each being configured to communicate with the mobile terminal so as to identify the mobile terminal and generate information about usage of the mobile terminal thereby; and a monitoring processor, configured to provide an indication of usage of the mobile terminal within the predefined geographical location range and to provide an indication of usage of the mobile terminal outside the predefined geographical location range, the indications of usage being based on the information about usage of the mobile terminal generated by the one or more telecommunication network cells. An indication of usage may comprise one or more of: a level of usage; a type of usage; a length of usage; specific usage details; and a lack of usage. These indications may be determined directly or indirectly from the information about usage of the mobile terminal generated by the one or more telecommunication network cells. For example, a lack of usage in one location may be determined indirectly based on usage in another location.

Existing systems (such as IMSI catchers and other devices) tend to take a snapshot of the various devices operating in the monitored area. They do not typically have a continuous monitoring capability, unlike the system described herein. The use of multiple telecommunication network cells may allow greater coverage to be obtained in a more granular fashion. Moreover, it may be possible to ensure that the coverage takes account of devices present in the monitored area on a very frequent basis. This frequency can be further increased by layering the femto cell cycles, for example, one set may be run out of phase from another within a predetermined time window, such as five minutes.

In an alternative or additional aspect, the monitoring processor may alternatively be configured to establish a level of authorisation for the mobile terminal (or for another mobile terminal) based on the information about usage of the mobile terminal generated by the one or more telecommunication network cells. For example, a level of authorisation may be based on an indication of usage within the predefined geographical location range which may be for at least or no more than a first time period and/or an indication of usage outside the predefined geographical location range which may be for at least or no more than a second time period. The first and/or second time periods may each comprise a time duration and/or a specific, optionally configurable range of times (for example, between 0600 and 0800, although the range of times may be discontinuous). The first and second time periods may both be minimum durations, maximum durations, ranges of time or be different criteria. The monitoring processor may be configured to collect all the data received from the telecommunication network cell or cells and analyse it in various ways. For example, it can monitor device type, access requirements, location and frequency of use. Anomalous behaviour may be quickly identified graphically by audible alarm and/or silently and in any case, can be logged for further use at a later point. The following features may be applied to either or both aspects.

There may be a plurality of telecommunication network cells and in that case, each may have a geographically distinct radio coverage area (in the sense that the cells have different coverage areas, although the coverage areas of the cells may overlap in some cases). Optionally, the monitoring processor is further configured to indicate relative movement of the mobile terminal between within the predefined geographical location range and outside the predefined geographical location range. An indication of relative movement may include a lack of relative movement, for example when the mobile terminal remains exclusively within or exclusively outside the predefined geographical location range for a period of time.

At least one, some or each of the one or more telecommunication network cells may be configured to appear to the mobile terminal as a fully functional cellular network access cell, but not to provide a telecommunication network service to the mobile terminal.

Identifying the mobile terminal involves communication with it. For example, a telecommunication network cell may be configured to identify the mobile terminal by receiving at least one identifier code from the mobile terminal and this may be the case for some or all of the one or more telecommunication network cells. The at least one identifier code may comprise one or more of: an International Mobile Subscriber Identity, IMSI; a Mobile Subscriber Integrated Services Digital Network, MSISDN; an International Mobile Equipment Identity, IMEI; and a Media Access Control, MAC, address, although typically the IMSI is used, since this can be referenced with a core network of the mobile terminals Home Public Land Mobile Network (HPLMN).

At least one, some or each of the one or more telecommunication network cells is advantageously configured to change a respective associated Location Area Code (LAC) at (regular or periodic) intervals, for instance every 5, 10, 15, 30, 45, 60 or 120 minutes and this period may be configurable. This change or cycling in LAC may allow the cell to cause the mobile terminal to regularly transmit its identity.

The one or more telecommunication network cells may be configured such that the geographically distinct radio coverage area in respect of at least one or some of the one or more telecommunication network cells defines the predefined geographical location range. In the preferred embodiment, the one or more telecommunication network cells are located in a pattern defining concentric circles.

In another aspect, there is provided a method for indicating usage of a mobile terminal within and outside a predefined geographical location range, comprising indicating usage of a mobile terminal within the predefined geographical location range and usage of the mobile terminal outside the predefined geographical location range, based on the information about usage of the mobile terminal generated by communication between one or more telecommunication network cells and the mobile terminal so as to identify the mobile terminal. Optionally, the method may further comprise communicating between one or more telecommunication network cells and the mobile terminal so as to identify the mobile terminal and generate information about usage of the mobile terminal thereby. Preferably, there are a plurality of telecommunication network cells, each having a geographically distinct radio coverage area. Such methods may optionally include features corresponding with any of those described herein with reference to the system. A computer program, configured to carry out any method disclosed herein, when operated by a processor, is also provided, although the method may also be implemented by a controller. A usage analysis system or a network entity configured to operate in accordance with any such method may further be considered.

Figure 2:
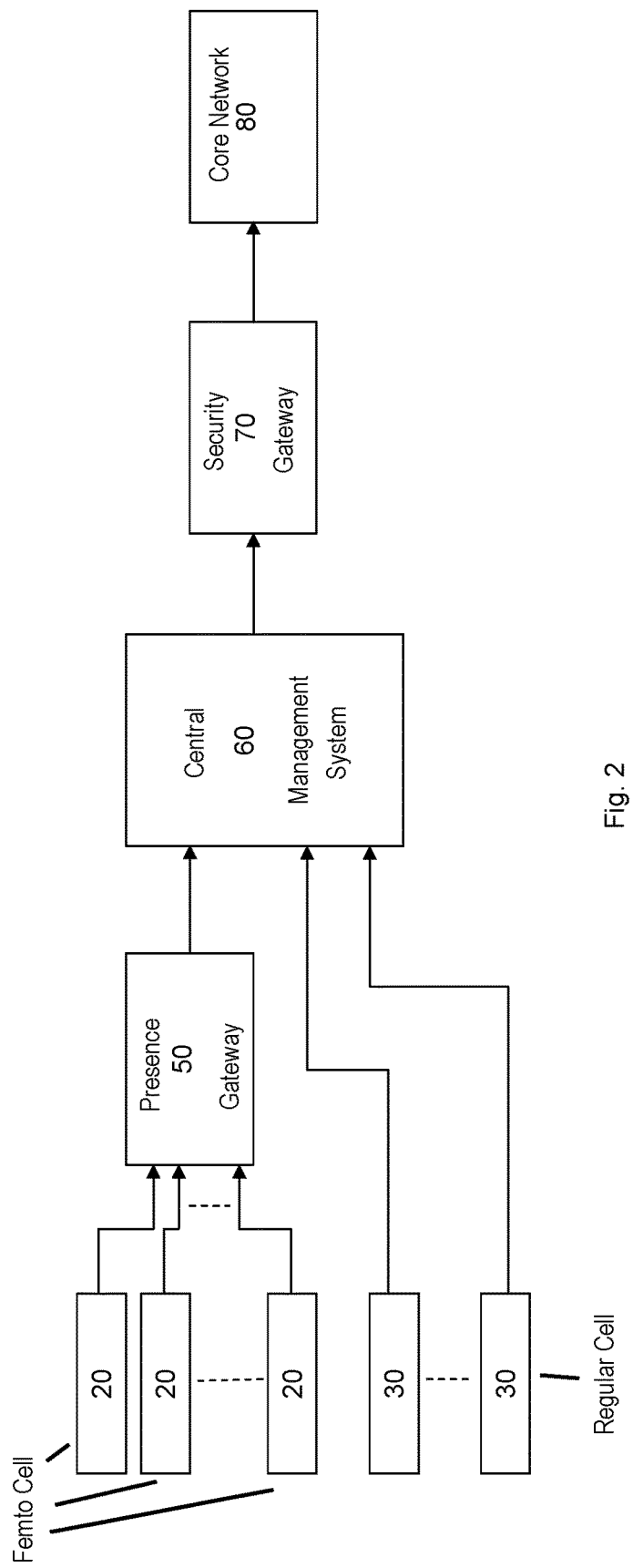
FIG. 2 shows a block diagram, illustrating a relationship between network entities in accordance with an embodiment.

Referring next to FIG. 2, there is shown a block diagram, illustrating a relationship between network entities in accordance with an embodiment. Where features from FIG. 1 are shown, the same reference numerals are used. Presence femto cells 20 interface with a presence gateway 50, which makes a determination about the usage of one or more mobile terminals. Moreover, presence femto cells 20 and regular cells 30 interface with a central management system 60, which provides access control. In practice, the presence gateway 50 and Central Management System (CMS) 60 may be considered (and optionally operated and/or implemented) together and may be termed a monitoring processor.

The CMS 60 is connected to a core network (CN) 80 of a mobile network, optionally via a security gateway 70. The CMS 60 performs comparisons between data stored in the CN 80 for the mobile terminal connecting to the managed small cell. In other words, it compares (if possible) to where the device has been previously connected. For instance, if no data is pre-stored in the CN 80 for a mobile network, the mobile terminal is connecting and registering to the network for the first time via the managed cell in a secure facility. In that case, there is a likelihood that the device is not authorised to be used in that area. In another example, it could be determined that the mobile terminal found to be operational within the secure facility had previously been operable in an entirely different location. This may be inferred, for example, by parsing previously stored LAC for that mobile terminal. This technique is optional, however, as the access control can simply be based on information from the presence cells, rather than the core network. As a consequence of the comparison, manual or automated decisions can be implemented for each UE identified at the CMS. Examples of the types of control and monitoring capabilities are which can be enacted are discussed below.

In generalised terms, the one or more telecommunication network cells are optionally configured to communicate with a core network (of a cellular telecommunications network). The core network may store additional usage information in respect of the mobile terminal. Then, the monitoring processor may be further configured to indicate usage of the mobile terminal within and outside the predefined geographical location range on the basis of the additional usage information in respect of the mobile terminal stored at the core network.

Further optional features will now be discussed. For example, the monitoring processor is preferably further configured to set an access permission for the mobile terminal to a telecommunication network service dependent on the indications of usage of the mobile terminal within and outside the predefined geographical location range. This access permission may control the access by the mobile terminal to a service provided through the one or more telecommunication network cells or, more preferably the telecommunication network service is provided by a telecommunication network separate from the one or more telecommunication network cells. The telecommunication network service may be provided by one or more than one of: a cellular network; a wireless Local Area Network, LAN; and a wireless Wide Area Network, WAN. The telecommunication network service may comprises one or more of a: voice service; video service; a short messaging service; and data service. The access permission may be different for different services. The access permission optionally comprises one or more of: complete access (white-list); partial access; no access (black-list); access with usage logging or supervision; an access class barring state; privileged or priority access; and visitor access. A combination of access permissions (not including no access) may be provided (grey-list). Preferably, the access permission is associated with at least one identifier code for the mobile terminal, which may be the same as the at least one identifier code used in identifying the mobile terminal to the one or more telecommunication network cells or it may be different. The at least one identifier code may comprise one or more of: an International Mobile Subscriber Identity, IMSI; a Mobile Subscriber Integrated Services Digital Network, MSISDN (typically less straightforward to obtain, however); an International Mobile Equipment Identity, IMEI; and a Media Access Control, MAC, address.

Access Control

User access to the network can be controlled using access control lists. Access control can be created and based upon the use of a number of identifiers such as IMSI, IMEI, MAC, MSISDN, or other relevant identifiers. The access control lists are stored at the CMS 60, and are updated in light of identifiers parsed from the networks small cells, or in light of pre-stored identifiers (for instance, devices with a certain MAC and are known to be stolen can be added to the blacklist). The following access control permissions may be possible:

black-list (identifiers refused access to the radio infrastructure; no service to be offered; can be overt denial or appear to have service but perform one; access requests can be logged; the list can be specific to hardware, SIM or equivalent or any other identifier);

white-list (all relevant services offered as per profile);

grey-list (items to keep a watch on; allow access or a limited form of access pending inspection, for example voice calls but no wireless LAN);

access class barring (utilise access class barring feature of 3GPP standards to manage access when required, such as discussed in 3GPP TS 22.011);

privileged access (in scenarios such enhanced Multi-Level Precedence and Pre-emption service, eMLPP, allow users to have more privileged access; can be in conjunction with other technologies like TETRA or other public safety technologies); and access in a visitor mode (the visitor or guest can be provided access as desired by the network manager).

Different parts of the same network may use any or all of the combinations above, for example a high security area may impose a permanent white-list, whereas reception may allow guest users or maintain a grey-list.

Call or Session Control

Depending on the user type, different combinations of service can be used. Examples include: data only; data on Wireless LAN or 3G or both; voice calls to specific numbers; or SMS. Alerts can be provided for each service accessed, for example, an SMS can be delivered to notify the user they have no permission to use a specific service or an SMS can be sent, but held for inspection prior to leaving the controlled environment.

When a device is rejected or managed it can be done in such a way as to ensure the network manager (such as the CMS 60) knows what will happen in the future. For instance, the device may not access the network again at all or may be rejected to another specific network to keep it on a deaf hold.

Monitoring of Mobile Terminal Capability

A number of monitoring modes may be implemented, as will be described below. These are not necessarily mutually exclusive and may be combined in different ways.

A first monitoring mode involves logging. All user activity can be logged in greater detail than in a normal network. A number of key logs may allow monitoring of access and usage to decide upon future response. An example of the usefulness of increased logging is where an unknown number of users and devices are present. All users are identified using the various parameters described earlier (MSISDN, IMEI, MAC etc.) and their location inferred using various measurement and reporting techniques and possibly stored in a unique profile in the CMS 60. Through a consistent monitoring approach over a period of time a high degree of assurance may be obtained concerning the location of the users and their activity. This may ensure a separation between neighbouring users, such as a house next to a secure location and users inside under evaluation.

A second monitoring mode uses protective security. A small cell often monitors neighbouring cells and the macro network to ascertain power levels and channels in use. Utilising this feature, small cells could monitor continuously to ascertain the presence of any other undesirable ("rogue", illegal or other) cells or devices that may be to the detriment of the security of the controlled network. Detection of unusual cells, equipment, devices using unusual LACs, cell identifiers, network identifiers or similar is highly desirable. By maintaining a constant monitoring capability, the CMS 60 can create alarms or otherwise record or notify the network managers of unusual activity or activity they desire to monitor.

In generalised terms, at least one (some or all) of the one or more telecommunication network cells is configured to monitor transmissions from other telecommunication network cells and to identify any of the other telecommunication network cells with transmissions matching a predefined criterion. The predefined criterion may be an unusual pattern of behaviour, a type of message transmission, or some other criterion or criteria relating to the operation of the cell.

A third monitoring mode is based on location. By careful placement of the infrastructure combined with RF and other measurements the location of devices can be accurately determined either immediately or after a period of time depending on the scenario (for example by RSRP measurements). Consistent measurement can be fed into the CMS 60, leaving feedback for the system managers to analyse either by way of another application or manually. This feedback loop allows the CMS 60 to identify the location to a high degree of assurance, any of the items they deem unusual, or to retrospectively analyse the movements and activity to any user even if on a white-list. Active location measurement is also possible by utilising many of the capabilities inferred by 3GPP standards, such as silent page, interrogation of the mobile terminal without forcing a network selection, measurement of certain parameters or similar.

In generalised terms, some or each of the one or more telecommunication network cells may be configured to determine a received signal measurement in respect of the mobile terminal. Then, the monitoring processor may be further configured to determine a location for the mobile terminal based on the received signal measurement in respect of the mobile terminal from one or more of the one or more telecommunication network cells.

Although an embodiment has now been described, the skilled person will consider various modifications and substitutions. For example, the separate use of presence femto cells 20 (which need not even be small cells) and an access network (such as regular cells 30) may not be necessary, as these may be combined. In some embodiments, the access network may be a different type of network from the presence cells, such as a wireless LAN or WAN. It will also be understood that, although a centralised monitoring and access control system is described, this may be implemented in other ways, such as a distributed system with each cell receiving information from other cells in order to make determinations and/or set access permissions for one or more mobile terminals. The combination of any specific features disclosed herein is also provided, even if that combination is not explicitly disclosed.

The invention claimed is:

1. A system for indicating usage of a mobile terminal within and outside a predefined geographical location range, comprising:
   a plurality of telecommunication network cells, each having a geographically distinct radio coverage area and each being configured to communicate with the mobile terminal so as to identify the mobile terminal and generate information about usage of the mobile terminal thereby; and
   a monitoring processor, configured to provide an indication of usage of the mobile terminal within the predefined geographical location range during a first time period and to provide an indication of usage of the mobile terminal outside the predefined geographical location range during a second time period, the indications of usage being based on the information about usage of the mobile terminal generated by the plurality of telecommunication network cells, wherein the first and second time periods comprise one of a specific time duration, a configurable time duration, a maximum time duration, a minimum time duration, and a range of time durations,
   wherein each of the plurality of telecommunication network cells is configured to appear to the mobile terminal as a fully functional cellular access network access cell, but not to provide a telecommunication network service to the mobile terminal,
   wherein the plurality of telecommunication network cells are configured such that geographically distinct radio coverage area in respect of some of the plurality of telecommunication network cells defines the predetermined geographical range, the plurality of telecommunication network cells being located in a pattern defining concentric rings.

2. The system of claim 1, wherein the monitoring processor is further configured to indicate relative movement of the mobile terminal between within the predefined geographical location range and outside the predefined geographical location range.

3. The system of claim 1, wherein each of the plurality of telecommunication network cells is configured to identify the mobile terminal by receiving at least one identifier code from the mobile terminal.

4. The system of claim 1, wherein each of the plurality of telecommunication network cells is configured to change a respective associated Location Area Code, LAC, at intervals.

5. The system of claim 1, wherein the monitoring processor is further configured to set a parameter in respect of the mobile terminal or another mobile terminal dependent on the indications of usage of the mobile terminal within and outside the predefined geographical location range.

6. The system of claim 5, wherein the monitoring processor is further configured to set an access permission for the mobile terminal to a telecommunication network service dependent on the indications of usage of the mobile terminal within and outside the predefined geographical location range.

7. The system of claim 6, wherein the telecommunication network service is provided by a telecommunication network separate from the one or more telecommunication network cells.

8. The system of claim 7, wherein the telecommunication network service is provided by one or more than one of: a cellular network; a wireless Local Area Network, LAN; and a wireless Wide Area Network WAN.

9. The system of claim 6, wherein the telecommunication network service comprises one or more of a: voice service; video service; a short messaging service; and data service.

10. The system of claim 6, wherein the access permission comprises one or more of: complete access; partial access; no access; access with usage logging or supervision; an access class barring state; privileged or priority access; and visitor access.

11. The system of claim 5, wherein the parameter or access permission is associated with at least one identifier code for the mobile terminal.

12. The system of claim 3, wherein the at least one identifier code comprises one or more of: an International Mobile Subscriber Identity, IMSI; a Mobile Subscriber Integrated Services Digital Network, MSISDN; an International Mobile Equipment identity, IMEI; and a Media Access Control, MAC, address.

13. The system of claim 1, wherein the plurality of telecommunication network cells are configured to communicate with a core network, the core network storing additional usage information in respect of the mobile terminal, the monitoring processor being further configured to provide indications of usage of the mobile terminal within and outside the predefined geographical location range on the basis of the additional usage information in respect of the mobile terminal stored at the core network.

14. The system of claim 1, wherein at least one of the plurality of telecommunication network cells is configured to monitor transmissions from other telecommunication network cells and to identify any of the other telecommunication network cells with transmissions matching a predefined criterion.

15. The system of claim 1, wherein each of the plurality of telecommunication network cells is configured to determine a received signal measurement in respect of the mobile terminal, the monitoring processor is further configured to determine a location for the mobile terminal based on the received signal measurement in respect of the mobile terminal from one or more of the one or more telecommunication network cells.

16. A method for indicating usage of a mobile terminal within and outside a predefined geographical location range, comprising:
   generating information about usage of the mobile terminal by communication between a plurality of telecommunication network cells over the mobile terminal, so as to identify the mobile terminal, each of the plurality of telecommunication network cells having a geographically distinct radio coverage area;
   providing indications of usage of a mobile terminal within the predefined geographical location range during a first time period and usage of the mobile terminal outside the predefined geographical location range during a second time period, based on the generated information about usage of the mobile terminal, wherein the first and second time periods comprise one of a specific time duration, a configurable time duration, a maximum time duration, a minimum time duration, and a range of time durations;
   wherein each of the plurality of telecommunication network cells is configured to appear to the mobile terminal as a fully functional cellular network, but not to provide a telecommunication network service to the mobile terminal, the plurality of telecommunication network cells being located in a pattern defining concentric rings.

17. A computer program product, having one or more non-tangible computer-readable media having thereon computer executable instructions that are structured such that, when executed by a processor of a computing system, cause the computing system to perform a method for indicating usage of a mobile terminal within and outside a predefined geographical location range, comprising:
   generating information about usage of the mobile terminal by communication between a plurality of telecommunication network cells over the mobile terminal, so as to identify the mobile terminal, each of the plurality of telecommunication network cells having a geographically distinct radio coverage area;
   providing indications of usage of a mobile terminal within the predefined geographical location range during a first time period and usage of the mobile terminal outside the predefined geographical location range during a second time period, based on the generated information about usage of the mobile terminal, wherein the first and second time periods comprise one of a specific time duration, a configurable time duration, a maximum time duration, a minimum time duration, and a range of time durations;
   wherein each of the plurality of telecommunication network cells is configured to appear to the mobile terminal as a fully functional cellular network, but not to provide a telecommunication network service to the mobile terminal, the plurality of telecommunication network cells being located in a pattern defining concentric rings.

* * * * *